US007777924B2

(12) United States Patent
Miyata

(10) Patent No.: US 7,777,924 B2
(45) Date of Patent: Aug. 17, 2010

(54) COLOR CONVERSION DEVICE AND COLOR CONVERSION PROGRAM

(75) Inventor: Yuji Miyata, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 478 days.

(21) Appl. No.: 11/476,569

(22) Filed: Jun. 29, 2006

(65) Prior Publication Data

US 2007/0013926 A1    Jan. 18, 2007

(30) Foreign Application Priority Data

Jun. 29, 2005    (JP) .............................. 2005-189661

(51) Int. Cl.
*G03F 3/08* (2006.01)
*H04N 1/46* (2006.01)
*H04N 1/60* (2006.01)
*G06F 13/28* (2006.01)

(52) U.S. Cl. ..................... 358/518; 358/504; 358/1.9; 711/173

(58) Field of Classification Search ............... 358/1.9
See application file for complete search history.

(56) References Cited

U.S. PATENT DOCUMENTS 5,121,196 A * 6/1992 Hung ........................ 358/504
2004/0064665 A1 * 4/2004 Samuel et al. ............. 711/173

FOREIGN PATENT DOCUMENTS

| JP | 8-307684 A | 11/1996 |
|---|---|---|
| JP | 9-69961 | 3/1997 |
| JP | 9-153130 | 6/1997 |
| JP | 2000-196903 | 7/2000 |
| JP | 2002-64718 | 2/2002 |
| JP | 2002-344757 | 11/2002 |
| JP | 2005-26835 | 1/2005 |
| JP | 2005-94126 | 4/2005 |

OTHER PUBLICATIONS

Japanese Office Action, with English translation, issued in Japanese Patent Application No. JP 2005-189661, mailed Jan. 22, 2008.

* cited by examiner

*Primary Examiner*—Twyler L Haskins
*Assistant Examiner*—Barbara D Reinier
(74) *Attorney, Agent, or Firm*—McDermott Will & Emery LLP

(57) ABSTRACT

A color conversion device includes: a color conversion table that stores the color-component values; an area selecting unit that selects a cube; an area coordinate determination unit that determines positions of an input values in the cube; a weighting factor obtaining unit that obtains a weighting factor on one lattice point included in the cube; a value storing unit that reads out the color-component values corresponding to lattice points; a multiplication unit that multiplies the color-component values with the weighting factor; an addition unit that cumulative adds the multiplication results; and an output unit that outputs the color-component values by each color, wherein: the value storing unit stores the color-component values of at least two colors by each color at mutually different areas of the arithmetic memory; and the multiplication unit multiplies the weighting factor respectively by the color-component values in a one multiplication processing.

20 Claims, 8 Drawing Sheets

FIG. 3

| LATTICE POINT P | | | COLOR-COMPONENT VALUE | | | | ACTUALLY STORED VALUE |
|---|---|---|---|---|---|---|---|
| R | G | B | C | M | Y | K | |
| 0 | 0 | 0 | 177 | 150 | 159 | 255 | B10096009F00FF00 |
| 0 | 0 | 85 | 255 | 218 | 130 | 128 | FF00DA0082008000 |
| 0 | 0 | 170 | 253 | 211 | 110 | 55 | FD00D3006E003300 |
| 255 | 255 | 255 | 0 | 0 | 0 | 0 | 0000000000000000 |

14b
LOOKUP TABLE (LUT)

FIG. 5

| AREA COORDINATES | | | WEIGHTING FACTOR W | | | | | | | | |
|---|---|---|---|---|---|---|---|---|---|---|---|
| r' | g' | b' | POINT 0 | POINT 1 | POINT 2 | POINT 3 | POINT 4 | POINT 5 | POINT 6 | POINT 7 | WEIGHTING FACTOR W$_T$ |
| 0 | 0 | 0 | 228 | 0 | 0 | 0 | 0 | 0 | 0 | 0 | 228 |
| 0 | 0 | 1 | 213 | 0 | 14 | 0 | 0 | 0 | 0 | 0 | 277 |
| 0 | 0 | 2 | 199 | 0 | 28 | 0 | 0 | 0 | 0 | 0 | 227 |
| ⋮ | ⋮ | ⋮ | ⋮ | | | ⋮ | | | | | ⋮ |
| 10 | 8 | 3 | 85 | 0 | 0 | 0 | 28 | 71 | 0 | 43 | 227 |
| 10 | 8 | 4 | 85 | 0 | 0 | 0 | 28 | 57 | 0 | 57 | 227 |

14c
TRIANGULAR PYRAMID INTERPOLATION TABLE

COLOR CONVERSION DEVICE AND COLOR CONVERSION PROGRAM

CROSS-REFERENCE TO THE RELATED APPLICATION(S)

This application is based upon and claims a priority from prior Japanese Patent Application No. 2005-189661 filed on Jun. 29, 2005, the entire contents of which are incorporated herein by reference.

TECHNICAL FIELD

Aspects of the present invention relate to a color conversion device and a color conversion program.

BACKGROUND

Colors displayed on a display consist of components of red, green and blue and called an RGB format on the basis of the respective initial letters. In contrast, colors used for printing by a printer are mainly consisting of color components of cyan, magenta, yellow and black, and are called a CMYK format also on the basis of the respective initial letters. Where colors displayed on a display are printed by a printer, a color conversion processing is needed, by which colors expressed by the RGB format are converted to those expressed by the CMYK format.

In theory, a color conversion processing from the RGB format to the CMYK format can be performed by a uniform formula. However, in general, the uniform formula can not provide satisfactory results for all colors, due to a difference in quality of ink or toner.

Therefore, a tool is used, which is called Lookup Table (hereinafter abbreviated as LUT). This is a table tabulated on the basis of a rule that predetermined color-component values of CMYK are to be used in accordance with predetermined color-component values of RGB. Where color-component values of RGB are given, for example, values from 0 to 255, respectively, approximately 16,770,000 combinations (256×256×256) of those color are available. An optimal color-component value of CMYK is given to each of these combinations. However, the combinations are available in such a larger number that it is difficult to store all data for the LUT due to a limited capacity, and it is also extremely troublesome to prepare the LUT.

Therefore, such a LUT is used in reality that certain representative points are selected from 256 stages of color-component values of RGB to arrange color-component values of CMYK corresponding to the representative points. The color-component values of RGB available at the representative points can obtain values of CMYK with reference to the LUT, directly. In contrast, for the color-component values of RGB not available at the representative points, approximate values must be calculated with reference to the representative points in the vicinity.

Methods for calculating the approximate value include, for example, a triangular pyramid interpolation (4-point interpolation), a triangular prism interpolation (6-point interpolation) and a rectangular interpolation (8-point interpolation). In these methods, several representative points in the vicinity of the color-component values of RGB that have been input are selected to calculate an approximate values with reference to values of the LUT at the representative points. In calculating the approximate value, addition and multiplication are repeatedly performed and division is finally performed with reference to the values of the LUT, as disclosed in JP-A-8-307684.

SUMMARY

However, the addition, multiplication and division processings are performed individually for four colors of cyan, magenta, yellow and black, thereby taking a longer time. Further, color conversion processing from the RGB format to the CMYK format in printing work must be conducted at every point. For example, where A4-sized sheets are to be printed at the resolution of 600 dpi, about 32,000,000 points must be subjected to color conversion, and a slight increase in the calculated amount in color conversion processing for one point results in a great decrease in speed in a whole color conversion processing.

Aspects of the present invention provide a color conversion device and a color conversion program, which are capable of improving the processing speed in a whole color conversion processing and also conducting the processing at a high accuracy.

According to an aspect of the invention, there is provided a color conversion device that converts input values including color-component values of a first color group into color-component values of a second color group corresponding to the input values for outputting, the color conversion device including: a color conversion table that stores the color-component values of the second color group, which are associated with lattice points specified by the color-component values of the first color group, in a color specification space having values corresponding to the color-component values of the first color group provided on axes coordinates; an area selecting unit that selects a cube, which contains positions of the input values therein, from cubes including lattice points to which the color-component values of the second color group correspond in the color conversion table; an area coordinate determination unit that determines positions of the input values in the cube selected by the area selecting unit; a weighting factor obtaining unit that obtains a weighting factor at least on one lattice point of the lattice points included in the cube based on the position of the input values determined by the area coordinate determination unit; a value storing unit that reads out the color-component values of the second color group corresponding to the lattice points for which the weighting factor is obtained by the weighting factor obtaining unit from the color conversion table, and the value storing unit storing the values in an arithmetic memory; a multiplication unit that multiplies the color-component values of the second color group stored in the arithmetic memory by the value storing unit with the weighting factor obtained with respect to lattice points corresponding to the color-component values of the second color group; an addition unit that cumulative addis of multiplication results of the lattice points obtained by the multiplication unit by each color; and an output unit that outputs the color-component values of the second color group corresponding to the input values on the basis of cumulative addition results by each color obtained by the addition unit, wherein: the value storing unit stores the color-component values of at least two colors of the second color group corresponding to the lattice points by each color at mutually different areas of the arithmetic memory; and the multiplication unit multiplies the weighting factor respectively by the color-component values stored in the arithmetic memory in a one multiplication processing.

According to another aspect of the invention, there is provided a computer program product for enabling a computer to converts input values including color-component values of a first color group into color-component values of a second color group corresponding to the input values for outputting, the computer program product including: software instructions for enabling the computer to perform predetermined operations; and a computer readable medium bearing the software instructions, wherein: the computer includes a color conversion table that stores the color-component values of the second color group, which are associated with lattice points specified by the color-component values of the first color group, in a color specification space having values corresponding to the color-component values of the first color group provided on axes coordinates; the predetermined operations includes: selecting a cube, which contains positions of the input values therein, from cubes including lattice points to which the color-component values of the second color group correspond in the color conversion table; determining positions of the input values in the selected cube; obtaining a weighting factor at least on one lattice point of the lattice points included in the cube based on the determined position of the input values; reading out the color-component values of the second color group corresponding to the lattice points for which the weighting factor is obtained from the color conversion table, and storing the values in an arithmetic memory; multiplying the color-component values of the second color group stored in the arithmetic memory with the weighting factor obtained with respect to lattice points corresponding to the color-component values of the second color group; cumulative adding the multiplication results of obtained the lattice points by each color; and outputting the color-component values of the second color group corresponding to the input values on the basis of cumulative addition results by each color; the storing of the value stores the color-component values of at least two colors of the second color group corresponding to the lattice points by each color at mutually different areas of the arithmetic memory; and the multiplying multiplies the weighting factor respectively by the color-component values stored in the arithmetic memory in a one multiplication processing.

According to the aspects, since the multiplication unit multiplies a weighting factor respectively by the color-component values of at least two colors stored in one arithmetic memory in a one multiplication processing, such an effect is obtained that the number of multiplications is reduced as compared with a case where a multiplication processing for multiplying the weighting factor by color-component values is conducted individually by each color, thereby improving a processing speed in a whole color conversion processing. In particular, where there are a large number of input values to be processed, the number of calculations can be reduced in a one color conversion processing, although to a small extent, thereby making it possible to greatly improve the processing speed in a whole color conversion processing.

BRIEF DESCRIPTION OF THE DRAWINGS

These and other objects and advantages of the present invention will be more fully apparent from the following detailed description taken in conjunction with the accompanying drawings, in which:

FIG. 3 is a view schematically showing the Lookup Table;

FIG. 5 is a view schematically showing a triangular pyramid interpolation table;

DETAILED DESCRIPTION OF THE ILLUSTRATIVE ASPECTS

Figure 1:
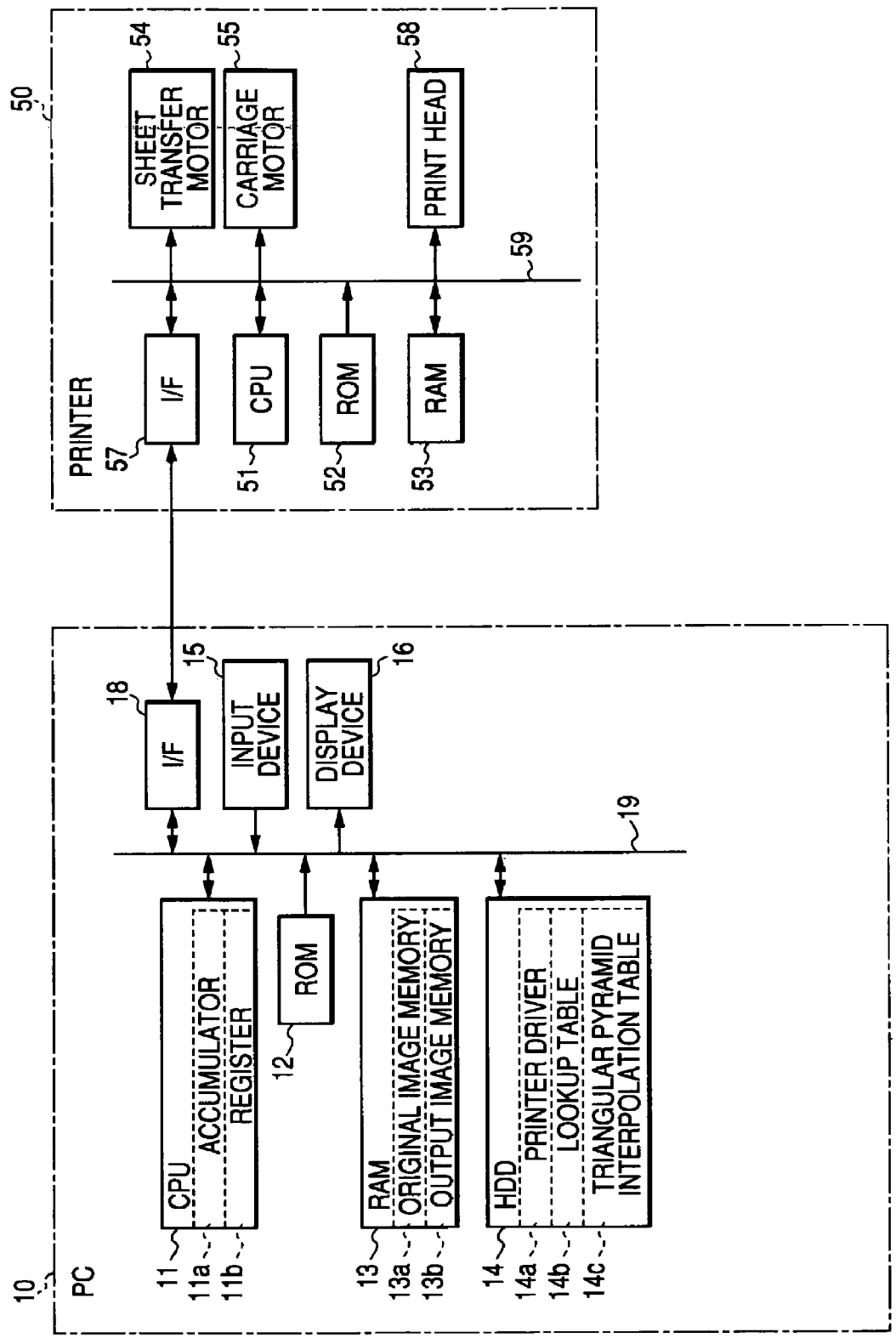
FIG. 1 is a block chart showing a whole configuration of a print system including a PC functioning as a color conversion device according to an aspect in the present invention.

Hereinafter, a description is given for preferred aspects of the present invention with reference to the attached drawings. FIG. 1 is a block diagram showing a whole configuration of a print system including a personal computer 10 (hereinafter referred to as PC 10) which functions as a color conversion device. The print system shown in FIG. 1 is provided with the PC 10 and a printer 50 connected to the PC 10.

The PC 10 is a unit which executes various processings such as a color conversion processing (refer to FIG. 7) to be described later with respect to document data and image data prepared by a document preparing application and an image preparing application, converts these data to print data that can be printed by the printer 50, and outputs them to the printer 50.

As shown in FIG. 1, the PC 10 is provided with a CPU 11, a ROM 12, a RAM 13, an HDD 14, an input device 15, a display device 16, and a printer interface 18 (I/F 18) connected to the printer 50.

The CPU 11 is a central processing unit which controls the printer server 10 and provided with an accumulator 11a and a register 11b. The CPU 11 also performs various programs including a printer driver 14a which performs a processing shown in the flowchart of FIG. 7. The CPU 11 of the present aspect is a 64-bit CPU. Here, the 64-bit CPU is a CPU which is capable of processing 64-bit (8-byte) data in a one arithmetic processing. Further, the CPU 11 functions as a multiplication unit and an addition unit in the color conversion processing (refer to FIG. 7) to be described later.

The accumulator 11a stores operands and computation results in an arithmetic processing by the CPU 11. Values to be stored at the accumulator 11a in the color conversion processing (refer to FIG. 7) will be described later with reference to FIG. 2. The register 11b is an 8-byte general register. The number of accumulators and registers provided on the CPU 11 is not limited to one unit, but the CPU 11 may be provided with plural units of general registers. FIG. 1, however, shows one accumulator 11a and one register 11b.

The ROM 12 is a read-only memory for storing various control programs executed by the CPU 11 and data necessary in executing the control programs by the CPU 11.

The RAM 13 is a memory for temporarily storing data and programs necessary for various processings executed by the CPU 11. The RAM 13 is provided with an original image memory 13a and an output image memory 13b. The original image memory 13a is a memory for storing original image data to be processed by the color conversion processing (refer to FIG. 7) described later. Original image data are bit map data in which the color density of pixels have color-component values of RGB. The original image data are converted to output image data in which the color density of pixels have color-component values of C (cyan), M (magenta), Y (yellow) and K (black) by the color conversion processing to be described later (refer to FIG. 7). The output image memory 13b is a memory for storing the output image data.

In the present aspect, the color-component values of RGB and the color-component values of CMYK are both described as any one of the values between 0 and 255. Further, RGB correspond to a first color group, while CMYK correspond to a second color group.

The HDD 14 is a hard-disk reading unit including a hard disk, and provided with a printer driver 14a, a lookup table 14b (LUT 14b) and a triangular pyramid interpolation table 14c.

The printer driver 14a is a program for converting document data and image data prepared by various applications such as a document preparing application and an image preparing application to print data that can be processed by the printer 50 and outputting them to the printer 50. The PC 10 conducts a rendering processing with respect to characters and images contained in document data and image data according to the printer driver 14a, thereby forming RGB-format original image data (print image data). Thereafter, various processings such as the color conversion processing and a binary processing are given to the RGB-format original image data to convert the data to print data. The color conversion processing will be described below with reference to FIG. 7. The PC 10 converts input values having the color-component values of RGB to the color-component values of CMYK corresponding to the input values and outputs the values by the color conversion processing.

The lookup table 14b is a table for storing the color-component values of CMYK which are associated with lattice points P specified by the color-component values of RGB in a color specification space S to be described later. The LUT 14b will be described below with reference to FIG. 3, while the color specification space S and the lattice point P will be described below with reference to FIG. 4.

The triangular pyramid interpolation table 14c is a table for storing 8-point weighting factors which are associated with area coordinates to be described below. The area coordinates will be described below with reference to FIG. 6, while the triangular pyramid interpolation table 14c will be described below with reference to FIG. 5.

The input device 15 inputs data or commands to the PC 10. The input device 15 maybe a keyboard, a mouse and the like. The display device 16 displays characters and images for visually confirming processing contents executed by the printer server 10 or input data. The display device 16 may be a CRT display, a liquid crystal display and the like.

The I/F 18 connects the PC 10 with the printer 50. The PC 10 sends print commands and print data to the printer 50 via the I/F 18, and enables the printer 50 to execute printing on recording sheets.

As shown in FIG. 1, the above described CPU 11, the ROM 12, the RAM 13, the HDD 14, the input device 15, the display device 16 and the I/F 18 are mutually connected via a bus line 19.

Further, as shown in FIG. 1, the printer 50 connected to the PC 10 is provided with a CPU 51, a ROM 52, a RAM 53, a sheet transport motor 54, a carriage motor 55, a print head 58, and an interface 57 (I/F 57) which is connected to the PC 10.

In the printer 50, the CPU 51 controls operation of the printer 50, and executes various programs. The ROM 52 is a memory for storing programs to control the operation of the printer 50.

The sheet transport motor 54 is a stepping motor for transporting recording sheets disposed at a predetermined position of the printer 50 in a direction from the upstream to the downstream or in a reverse direction, and the movement thereof is controlled by the CPU 51. The carriage motor 55 is a stepping motor for driving a carriage (not shown) mounting the print head 58 so as to reciprocate the carriage between a starting point (initial position of the carriage) and an end point which is a limit position opposite to the starting point in an orthogonal direction to a direction along which the sheets are transported by the sheet transfer motor 54. The movement of the carriage motor 55 is controlled by the CPU 51.

The print head 58 is an ink-jet head equipped with a plurality of nozzles and an actuator (not shown). The print head 58 injects ink from the nozzles through driving of the actuator controlled by the CPU 51, thereby printing predetermined characters or patterns. Further, the I/F 57 connects the printer 50 with the PC 10. The print commands and print data are input from the PC 10 via the I/F 57.

As shown in FIG. 1, the above described CPU 51, the ROM 52, the RAM 53, the sheet transport motor 54, the carriage motor 55, the print head 58 and the I/F 57 are mutually connected via a bus line 59.

Figure 2:
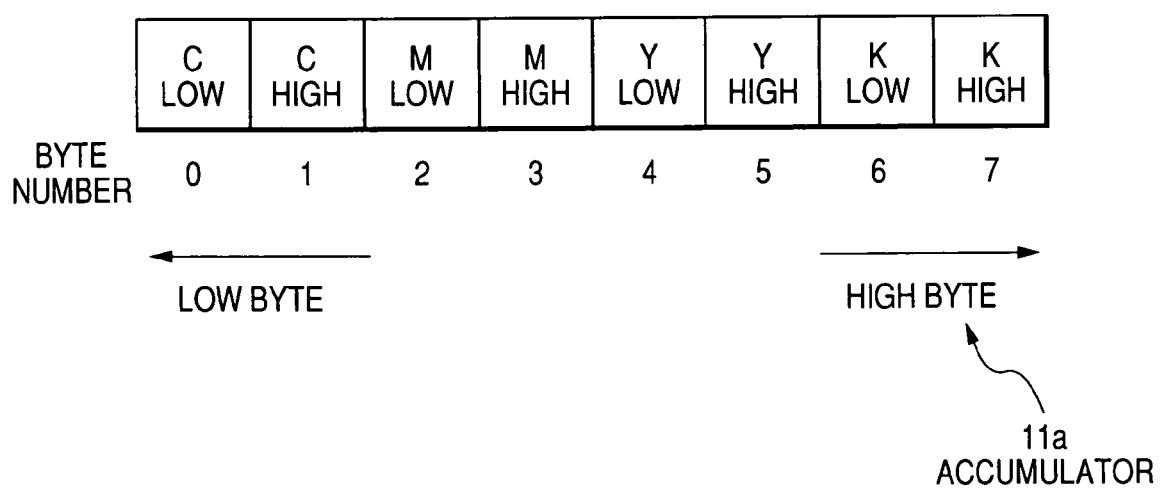
FIG. 2 is a view schematically showing color-component values of CMYK stored in an accumulator.

Next, with reference to FIG. 2, a description is given for the color-component values of CMYK read out from the LUT 14b and stored in the accumulator 11a in the color conversion processing to be described later (refer to FIG. 7). FIG. 2 is a view schematically showing the color-component values of CMYK stored in the accumulator 11a.

As shown in FIG. 2, the accumulator 11a is an 8-byte memory. In FIG. 2, a description is made by giving byte numbers of 0 to 7 to bytes in an ascending order of bytes. As shown in FIG. 2, the color-component values of four colors of CMYK are stored by each color at mutually different areas of the accumulator 11a. For example, a color-component value of C is stored at an area indicated by the byte number of 0 and 1, a color-component value of M is stored at an area denoted by the byte number of 2 and 3, a color-component value of Y is stored at an area indicated by the byte number of 4 and 5, and a color-component value of K is stored at an area indicated by the byte number of 6 and 7. In the present aspect, since the color-component values of CMYK are, as described above, any one of the values between 0 and 255, they can be stored individually at 2-byte areas. Further, in the present aspect, as described above, the CPU 11 is a 64-bit CPU, thereby making it possible to process 8-byte (64-bit) data stored in the accumulator 11a in a one arithmetic processing.

Next, a description is given of the LUT 14b with reference to FIG. 3. FIG. 3 is a view schematically showing the configuration of the LUT 14b. As shown in FIG. 3, the color-component values of CMYK correspond to each lattice points P.

Figure 4:
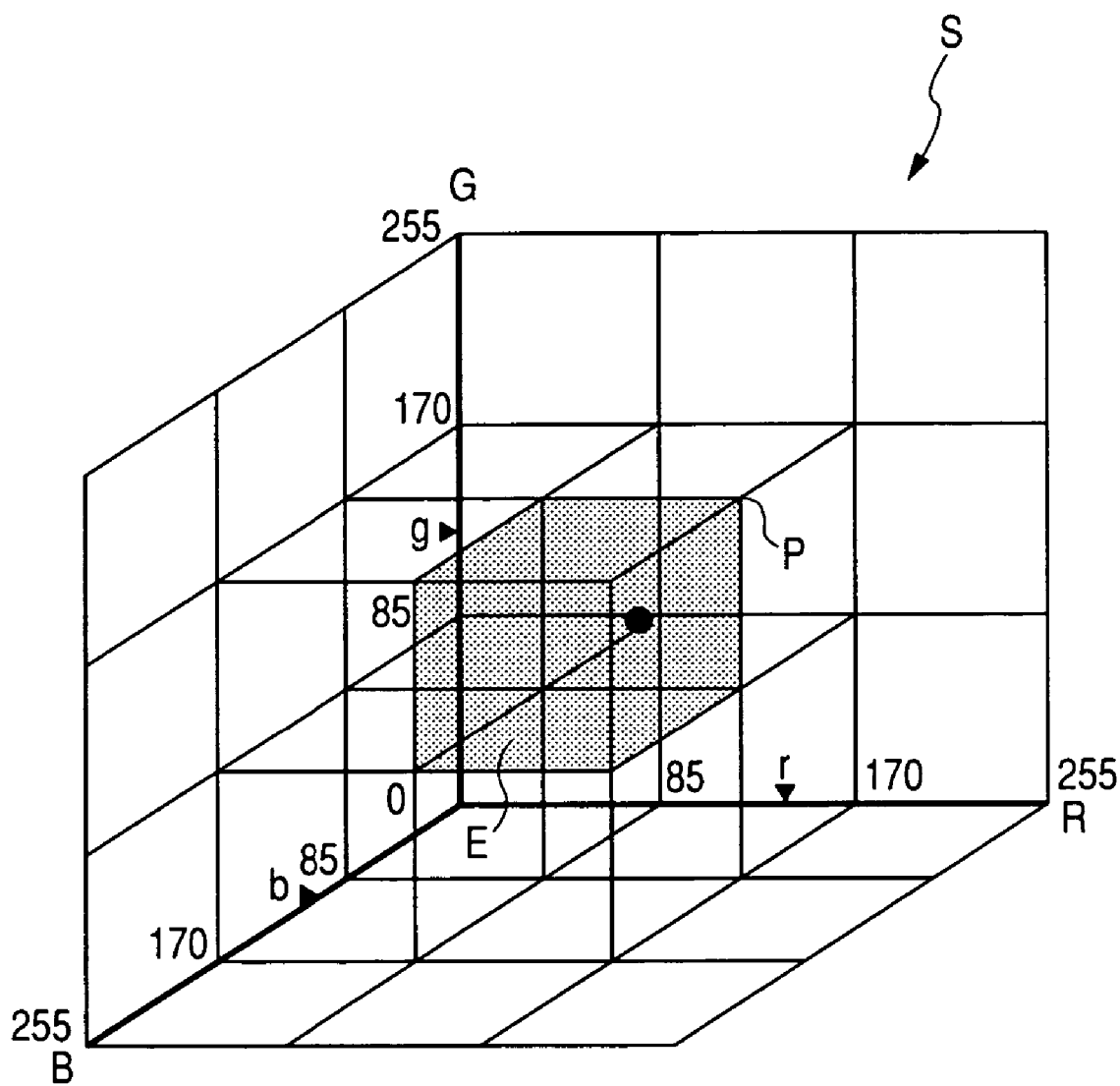
FIG. 4 is a view schematically showing a color specification space.

Now, a description is given of the lattice points P and the color specification space S with reference to FIG. 4. FIG. 4 is a view schematically showing the color specification space S. As shown in FIG. 4, the color specification space S is a three-dimensional space in which the color-component values of RGB are arranged on an axis of coordinates. A plurality of cubes which divide the color specification space S are designated as areas E, and apexes of each area E is designated as the lattice point P. In FIG. 4, for an easy understanding of the view, only one area E is colored, and a symbol P is given to only one lattice point.

In the present aspect, a description is given on the assumption that each axis of coordinates is divided into three equal portions, by which the color specification space S is divided into 27 equal spaces. Further, the lattice point P is a point at which the color-component values of RGB are any one of 0, 85, 170 or 255 in the color specification space S.

As shown in FIG. 3, the LUT 14b stores the color-component values of CMYK which correspond to the lattice points P. For example, C (177), M (150), Y (159) and K (255) correspond to a lattice points P specified by (R, G, B)=(0, 0, 0) as color-component values (parenthesized numbers are values expressed by decimal notation). In FIG. 3, for an easy understanding of drawings, an illustration is given so that the color-component values of CMYK are independently stored in the LUT 14b. However, it is acceptable that the color-component values of CMYK are not stored independently in the LUT 14b.

Values actually stored in the LUT 14b corresponding to the lattice points P are listed on the right column of the LUT 14b in FIG. 3. For example, the color-component values of CMYK, which correspond to a lattice points P specified by (R,G,B)=(0,0,0), are actirally stored in the LUT 14b as "B10096009F00FF00" (expressed by hexadecimal notation). More specifically, the color-component values of CMYK, which correspond to the lattice points P are stored in the LUT 14b as an 8-byte data.

The LUT 14b is provided with an 8-byte memory storing the color-component values of CMYK which correspond to the lattice points P, and the color-component values of CMYK corresponding to the lattice points P are stored as an 8-byte data in the 8-byte memory of the LUT 14b. It is noted that regarding values actually stored in the LUT 14b of FIG. 3, values on the left side of the drawing are corresponding to low bytes, while values on the right side are corresponding to high bytes. Further, the color-component values of CMYK are stored by each color at 2-byte areas of 8-byte memory. In the present aspect, since a maximum value of the color-component values of CMYK is 255 and can be expressed by 1 byte, 0 is stored in the high bytes, of 2-byte areas provided for each color.

Further, the 8-byte memory of the LUT 14b stores the color-component values in the order of CMYK arid in an ascending order of low bytes. For example, if a value stored in the 8-byte memory which correspond to a lattice point P is "B10096009F00FF00", a color-component value of C which correspond to the lattice point P is "B100", a color-component value of M is "9600", a color-component value of Y is "9F00" and a color-component value of K is "FF00". It is noted that these values are all expressed by hexadecimal notation.

Next, a description is given for a triangular pyramid interpolation table 14c with reference to FIG. 5. FIG. 5 is a view schematically showing the triangular pyramid interpolation table 14c. As shown in FIG. 5, the triangular pyramid interpolation table 14c is a table in which weighting factors are associated with area coordinates. It is noted that a total weighting factor $W_T$ shown at the right end of the triangular pyramid interpolation table 14c shown in FIG. 5 corresponds to a sum of weighting factors W from point 0 to point 7. The total weighting factor $W_T$ may not be necessarily stored in the triangular pyramid interpolation table 14c but is shown here for explanation.

Here, a description is given for the area coordinates, with reference to FIG. 4. In the color conversion processing to be described later (refer to FIG. 7), when values having the color-component values of RGB are input, an area E is selected, which contains positions of the input values (namely, coordinates specified by the input values) therein. For example, where the color-component values of RGB constituting the input values are r, g and b, an area E is selected, which contains coordinates (r, g and b) therein. FIG. 4 shows the selected area E in color.

Figure 6:
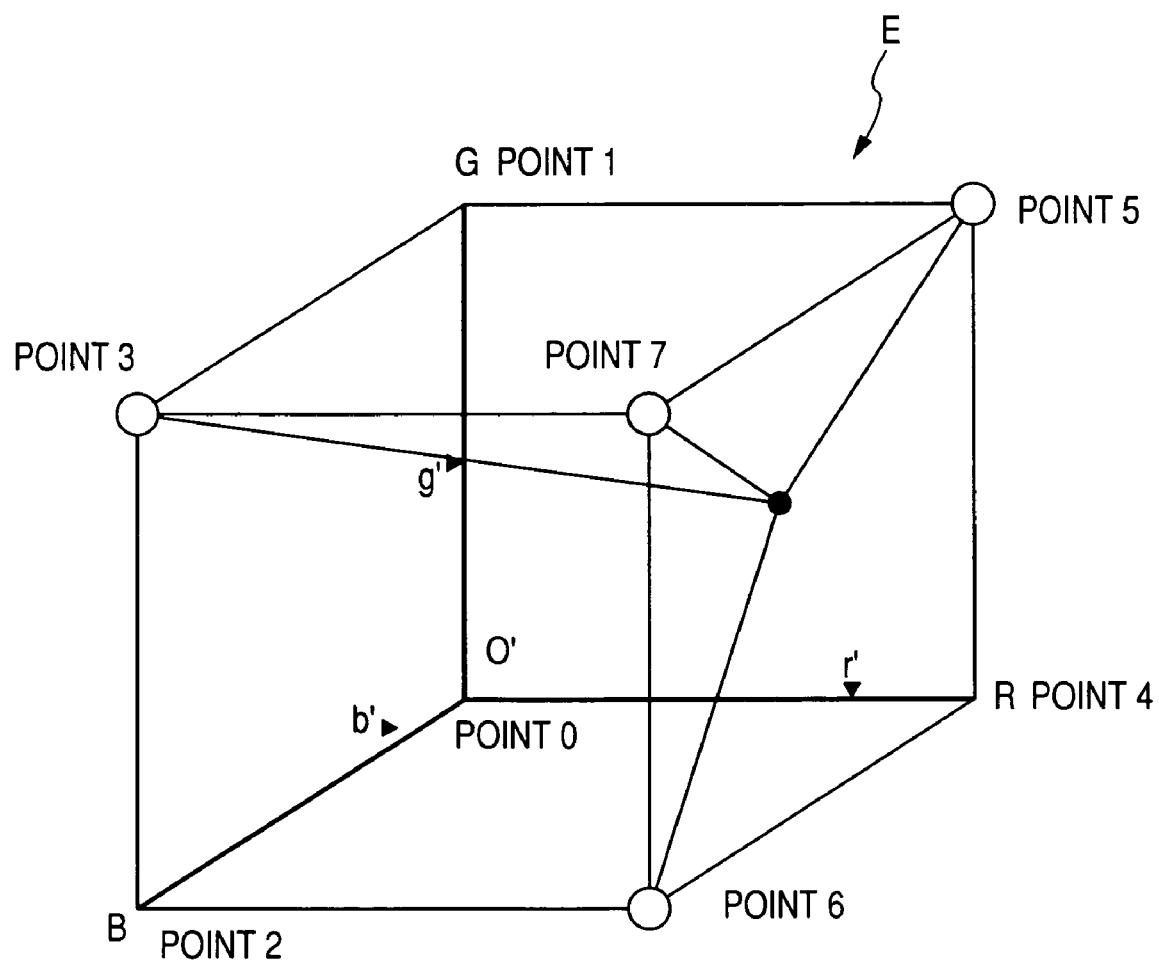
FIG. 6 is a view schematically showing a position of an input value at a selected area.

With reference to FIG. 6, a detailed explanation will be made for the "area coordinates". FIG. 6 is a view schematically showing positions of the input values at the selected area E (namely, area coordinates). As shown in FIG. 6, among 8 lattice points constituting the selected area E, a lattice point closest to an original point 0 in the color specification space S is regarded as an area original point 0'. Positions of the input values (r', g', b') obtained this situation correspond to area coordinates. In the present aspect, the length of each axis of coordinates in the color specification space S is 255, which is a maximum value of the color-component values of RGB. Since the length of one side of the areas E is 85 (=255/3), area coordinates (r', g', b') of the input values in which the color-component values of RGB are respectively r, g and b can be expressed respectively by the following formula 1.

$r' = r \, \%85$ $g' = g \, \%85$ $b' = b \, \%85$ (Formula 1)

% is a symbol denoting a remainder obtained when a value on the left of the symbol is divided by a value on the right of the symbol.

Further, with reference to FIG. 6, a description is given for the lattice points constituting the selected area E. A description is made by giving a symbol of point 0 to an area original point 0' and also giving symbols of point 1 through point 7 individually to other lattice points, of 8 lattice points constituting the selected area E. In the color conversion processing to be described later (refer to FIG. 7), on the basis of area coordinates (r', g', b'), the respective weighting factors W covering point 0 to point 7 are obtained.

As shown in FIG. 5, points of the weighting factors W are stored in advance in the triangular pyramid interpolation table 14c while being associated with area coordinates. "Weighting factors W" are values which indicate a distance from area coordinates to the points from point 0 to point 7 and which are used for calculating the color-component values of CMYK corresponding to input values not on the lattice points P. The triangular pyramid interpolation table 14c of the present aspect is configured in such a way that a maximum value of the total weighting factor $W_T$ which is a sum of weighting factors W of the points is greater than 127 (=$2^7$−1) but is 255 or less (=$2^8$−1).

The color-component values of CMYK, which correspond to the lattice points, and weighting factors W are used to perform interpolation. The input values are converted to the color-component values of CMYK and output as c, m, y and k by the interpolation, even when the input values are not on the lattice points P. The following formula 2 shows an example in which weighting factors W are used to calculate the color-component values of CMYK, namely, c, m, y and k.

$c = (C_0 W_0 + C_1 W_1 + C_2 W_2 + C_3 W_3 + C_4 W_4 + C_5 W_5 + C_6 W_6 + C_7 W_7)/W_T$ $m = (M_0 W_0 + M_1 W_1 + M_2 W_2 + M_3 W_3 + M_4 W_4 + M_5 W_5 + M_6 W_6 + M_7 W_7)/W_T$ $y = (Y_0 W_0 + Y_1 W_1 + Y_2 W_2 + Y_3 W_3 + Y_4 W_4 + Y_5 W_5 + Y_6 W_6 + Y_7 W_7)/W_T$ $k = (K_0 W_0 + K_1 W_1 + K_2 W_2 + K_3 W_3 + K_4 W_4 + K_5 W_5 + K_6 W_6 + K_7 W_7)/W_T$ (Formula 2)

Wherein:

$W_T$ (total weighting factor) = $W_0 + W_1 + W_2 + W_3 + W_4 + W_5 + W_6 + W_7$;

The color-component values of CMYK which are associated with lattice points corresponding to a point X: $C_x$, $M_x$, $Y_x$, $X_x$; and Weighting factor at the point X: $W_x$ According to the above formula 2, the color-component values of CMYK which correspond to lattice points having a large weighting factor are reflected on calculation results to a great extent, while the color-component values of CMYK which correspond to lattice points having a small weighting factor are reflected on the calculation results to a small extent. As a result, it is possible to calculate the color-component values of CMYK on the basis of the color-component values of CMYK which correspond to the lattice points in the vicinity, even if the input values are not on the lattice points.

Where a weighting factor $W_x$ is 0, a multiplication result obtained by multiplying color component values, $C_x$, $M_x$, $Y_x$ and $K_x$ by the weighting factor $W_x$ is 0. Therefore, the color-component values of CMYK which correspond to lattice points corresponding to a point X will not influence the calculation result. In other words, where the weighting factor W is not 0, lattice points corresponding to the point are used in the interpolation. As shown in FIG. 5 and FIG. 6, in the present aspect where weighting factors W are stored at 8 points with respect to each area coordinates, of these 8 points, points at which the weighting factor is not 0 exist four in maximum with respect to each area coordinates. More specifically, these four points are used to perform the interpolation. This interpolation method is in general called a four-point interpolation, a triangular pyramid interpolation, or a tetrahedron interpolation. In the present aspect, the four-point interpolation is used as the interpolation. However, other appropriate methods may be used. For example, a 6-point interpolation in which 6 points are used to perform an interpolation, among 8 points constituting an area, (also called a triangular prism interpolation or a prism interpolation) and an 8-point interpolation in which 8 points are used to perform an interpolation (also called a rectangular interpolation or a cube interpolation) may be employed.

Figure 7:
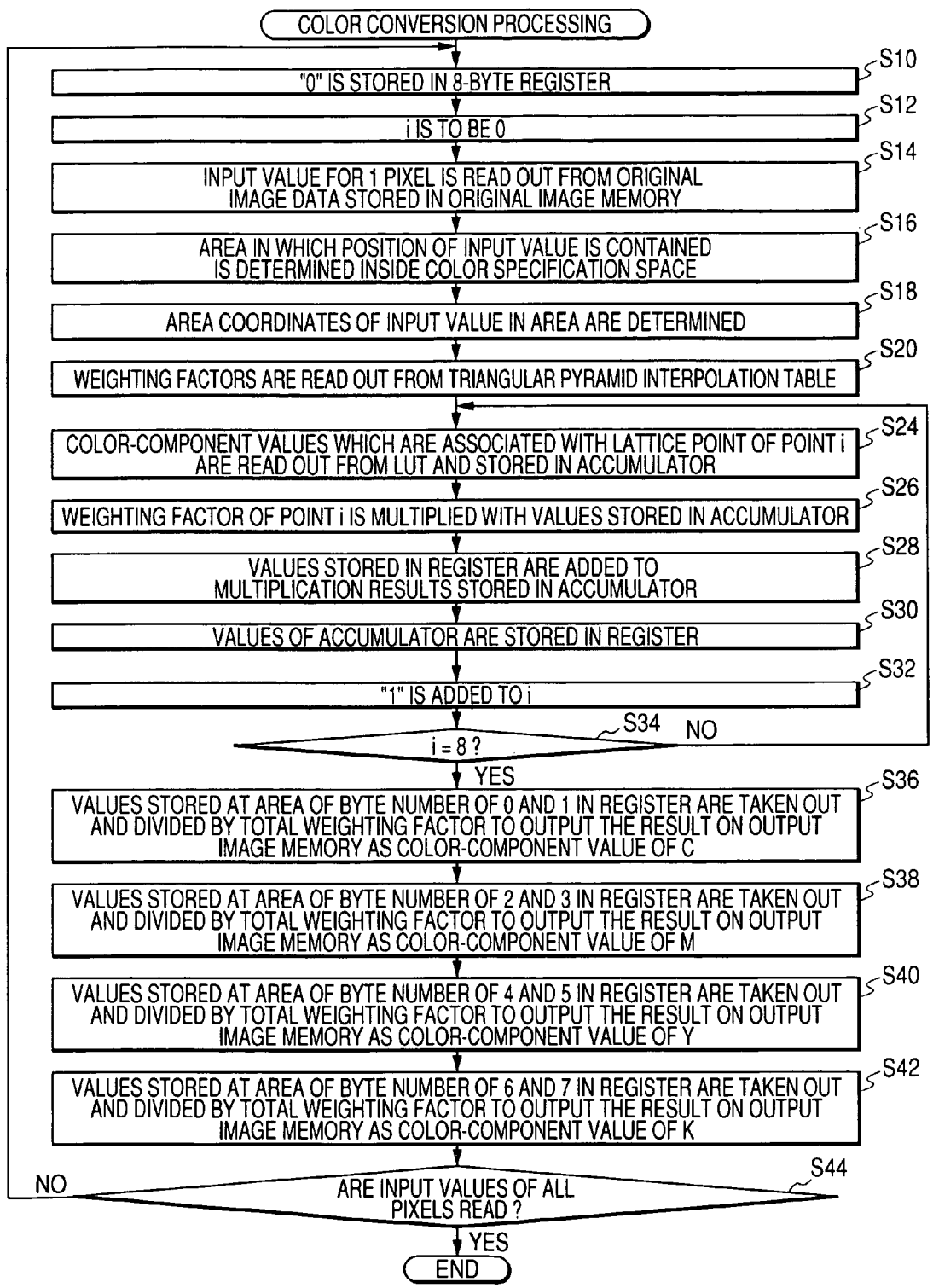
FIG. 7 is a flowchart showing a color conversion processing executed by the PC.

Next, a description is given of the color conversion processing executed by the above-described PC10, with reference to the flowchart of FIG. 7. FIG. 7 is a flowchart of the color conversion processing executed by the PC 10. The color conversion processing is a processing which is started when original image data are stored in the original image memory 13*a* and executes an arithmetic processing corresponding to the arithmetic processing explained in the above formula 2.

At first, "0" is stored in an 8-byte register 11*b* (S10) Next, a variable i is given "0" (S12). Next, an input value for 1 pixel is read out from original image data stored in the original image memory 13*a* (S14). The input value is a value corresponding to the color density of pixel and consists of the color-component values of RGB.

Next, an area E is selected, which contains the position of the input values in a color specification space S (S16). More specifically, the area E is selected, which contains therein coordinates (r, g, b) expressed by the color-component values of RGB (r, g, b) constituting the input value (refer to FIG. 4).

Next, a decision is made for the area coordinates (position of the input value) in the selected area E (S18). Since a method for calculating the area coordinates (r', g', b') is shown in the above formula 1 in the case where the color-component values of RGB are r, g and b, a detailed explanation will be omitted here.

Next, a weighting factor W is obtained with respect to 8 lattice points constituting the area E on the basis of the determined area coordinates (r', g', b'). In the present aspect, 8-point weighting factors W which correspond to the area coordinates (r', g', b') in the triangular pyramid interpolation table 14*c* (refer to FIG. 5) are read out from the triangular pyramid interpolation table 14*c* (S20).

Next, of 8 points from which a weighting factor W is obtained, the color-component values of CMYK which correspond to lattice points corresponding to a point i are read out from the LUT 14*b* (refer to FIG. 3), and stored in the accumulator 11*b* (refer to FIG. 2) (S24). Since at first, the point i is "0", the color-component values of CMYK which are associated with a lattice point corresponding to the point 0 are stored in the accumulator 11*b*.

Here, as described above, the color-component values of CMYK are stored as a mass of 8-byte data in the LUT 14*b* (refer to FIG. 3). Therefore, the CPU 11 can read the color-component values of CMYK which correspond to a lattice point corresponding to the point i from the LUT 14*b* and store them in the accumulator 11*b*, thereby improving a processing speed, as compared with a case where color-component values are read by each color and stored sequentially in the accumulator 11*b*.

Next, the weighting factors W obtained for the point i is multiplied with the color-component values of CMYK stored in the accumulator 11*b* (S26). For example, where area coordinates of input values are (0, 0, 1), "213" is obtained as the weighting factor W of the point 0 (refer to FIG. 5). Therefore, "213" is multiplied by the color-component values of CMYK stored in the accumulator 11*b*.

As described above, a weighting factor is multiplied in a one multiplication processing respectively by the color-component values of four colors of CMYK stored in an accumulator 11*a*, thereby reducing the number of multiplications to improve a processing speed, as compared with a case where a multiplication processing in which a weighting factor is multiplied by color-component values is conducted individually by each color.

As explained with reference to FIG. 2, since a 2-byte area is allocated by each color and stored at mutually different areas of an accumulator 11*a*, no overflow is developed in a multiplication processing, and the multiplication processing can be conducted at a high accuracy. More specifically, in the present aspect, a maximum value of the color-component values of CMYK is constituted so as to be 255 ($=2^8-1$) or less and a maximum value of total weighting factors $W_T$ stored in a triangular pyramid interpolation table 14*c* is constituted so as to be 255 ($=2^8-1$) or less. Therefore, multiplication results in which a weighting factor W is multiplied by the color-component values of CMYK are to be $2^{16}-1$ or less. Thereby, since multiplication results by each color are inevitably stored within a 2-byte area, such an event is prevented that the multiplication results of certain color-component values overflow into another area inside one accumulator 11*a* to destroy the multiplication results of other color-component values.

Next, values stored in a register 11*b* are added to multiplication results stored in an accumulator 11*a* (S28), the addition results of which are stored in the register 11*b* (S30) "1" is added to a variable i and processings from S24 to S34 are repeated until the variable i reaches 8 (S34: Yes).

Therefore, cumulative results in which multiplication results of each point are cumulatively added are to be stored at mutually different areas of one register 11*b* in the same arrangement as one accumulator 11*a*. More specifically, when a description is made by giving the byte number to each byte sequentially from low bytes of an 8-byte register 11*b*, as explained with reference to FIG. 2, a cumulative value of C is stored at an area denoted by the byte number of 0 or 1, a cumulative value of M is stored at an area denoted by the byte number of 2 or 3, a cumulative value of Y is stored at an area indicated by the byte number of 4 or 5, and an cumulative value of K is stored at an area indicated by the byte number of 6 or 7.

As described above, since the cumulative values of CMYK are stored in the register 11*b* in the same arrangement as the accumulator 11*a*, cumulative values stored in the register 11*b* and multiplication results stored in the accumulator 11*a* are added by each color at a one addition processing. Thereby, the number of additions is reduced to improve a processing speed in a whole color conversion processing, as compared with a case where an addition processing in which multiplication results and cumulative values are added is conducted by each color.

Further, all the multiplication results from point 0 to point 7 are cumulatively added, by which cumulative addition results are to be stored in a register 11*b*.

A maximum value of the color-component values of CMYK is constituted so as to be 255 ($=2^8-1$) or less and a maximum value of total weighting factors $W_T$ stored in a triangular pyramid interpolation table 14*c* is constituted so as to be 255 ($=2^8-1$) or less. Therefore, cumulative addition results by each color in which multiplication results of point 0 to point 7 are cumulatively added are to be $2^{16}-1$ or less. More specifically, since multiplication results by each color are inevitably stored within a 2-byte area, such an event is prevented that the multiplication results of certain color-component values overflow into another area inside one register 11*b* to destroy the multiplication results of other colors.

Next, cumulative addition results stored by each color in the register 11*b* are taken out and divided by a total weighting factor $W_T$. More specifically, at first, cumulative addition results stored at an area indicated by the byte number of 0 or 1 in the register 11*b* are taken out and divided by a total weighting factor $W_T$ to output the division result of C' in an output image memory 13*b* (S36). Next, cumulative addition results stored at an area indicated by the byte of 2 or 3 in the register 11*b* are taken out and divided by a total weighting factor $W_T$ to output the division result of m' in the output image memory 13*b* (S38) Next, cumulative addition results stored at an area indicated by the byte number of 4 or 5 in the register 11*b* are taken out and divided by a total weighting factor $W_T$ to output the division result of y' in the output image memory 13*b* (S40). Next, cumulative addition results stored at an area indicated by the byte number of 6 or 7 in the register 11*b* are taken out and divided by a total weighting factor $W_T$ to output the division result of k' in the output image memory 13*b* (S42).

Cumulative addition results are read out by each color from the register 11*b* and the read out cumulative addition results are individually divided by a total weighting factor $W_T$, thereby making it possible to conduct an arithmetic processing at a high accuracy. More specifically, an addition processing and a multiplication processing are conducted for four colors at the same time and a division processing is conducted by each color, thereby making it possible to conduct an arithmetic processing at a high accuracy. Digit numbers below a decimal point may be made great in conducting a division processing, if division results are not integral numbers. Therefore, where a configuration is made so that division results of a plurality of colors are stored in one memory, a division result of any one of the colors may overflow to destroy division results of other areas.

Next, a determining is made for whether input values of all pixels for original image data stored in an original image memory 13*a* are read or not (S44), and the processing is repeated until input values of all pixels for the original image data are determined to have been read (S44: Yes). As a result, original image data in which the color density of the pixels consists of the color components of RGB are converted to output image data in which the color density of the pixels consists of the color components of CMYK and stored in an output image memory 13*b*. The output image data stored in the output image memory 13*b* are subjected to various processings such as a binary processing, converted to print data and output to a printer 50. Since the processings after color conversion are in the public domain, a detailed explanation will be omitted here.

An explanation has been above made for the present invention with reference to the aspects. However, the present invention is not restricted to the aspects. It may be easily estimated that the present invention is modified or changed in versatile ways within a scope not deviating from the object hereof.

In the present aspect, for example, a processing in which weighting factors W obtained with respect to points 0 to 7 are multiplied by the color-component values of CMYK stored in an accumulator 11*a* is conducted for all the points from 0 to 7. However, where a weighting factor W is 0, such a configuration may be provided that a multiplication processing and ran addition processing in which multiplication results of the multiplication processing are cumulatively added are omitted.

Figure 8:
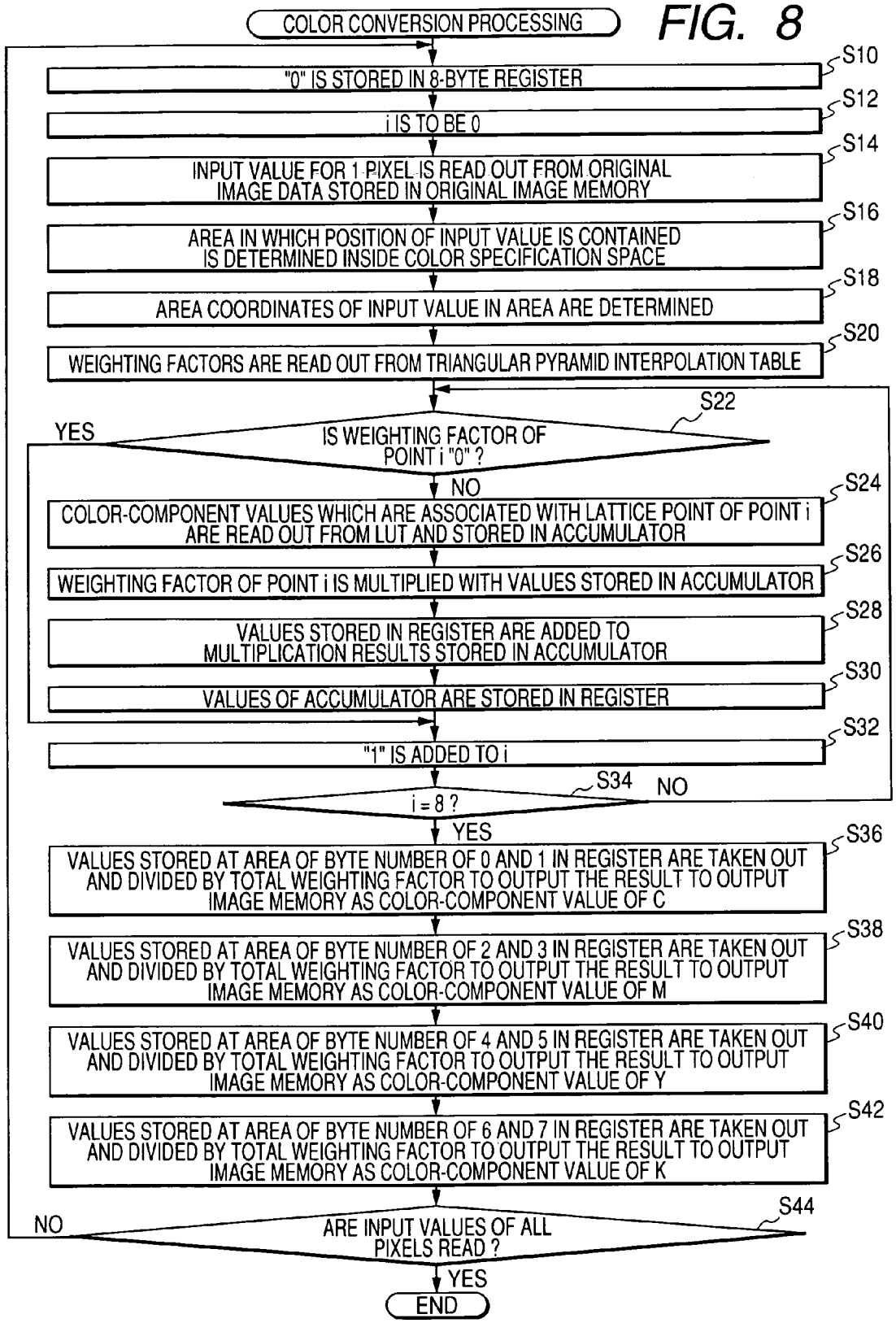
FIG. 8 is a flowchart showing an exemplified variation of the color conversion.

FIG. 8 is a flowchart showing an exemplified variation of the color conversion processing in FIG. 7. The same symbol is given to the processing in FIG. 8 which is the same as that in FIG. 7 and the explanation is omitted. The flowchart of the color conversion processing shown in FIG. 8 is different from that of the color conversion processing shown in FIG. 7 in that a processing (S22) for determining whether a weighting factor Wi obtained with respect to a point i is "0" or not is provided.

Where the weighting factor Wi obtained with respect to the point i is not "0" (S22: No), the color-component value of CMYK which is associated with a lattice point of the point i is read out from a LUT 14*b* and stored in an accumulator 11*a* (S24). Next, processings from S26 to S30 are conducted, which have been explained with reference to FIG. 7.

In contrast, where a weighting factor Wi obtained with respect to a point i is "0" (S22: Yes), the processings from S26 to S30 are omitted to improve a processing speed in a whole color conversion processing. More specifically, where the weighting factor Wi is 0, multiplication results obtained by multiplying the weighting factor Wi by the color-component values of CMYK are to be 0 and commutative values will not be changed upon addition of the multiplication results of 0. Therefore, where the weighting factor Wi is 0, the multiplication processings and addition processings conducted from S24 to S30 are omitted, thereby making it possible to further improve the processing speed.

In the present aspect, the CPU 11 has a 64-bit CPU, but the CPU 11 may have a 32-bit CPU. In this instance, an accumulator 11*a* is constituted so as to store 4-byte data. Next, a 2-byte area is allocated by each color to the accumulator 11*a* in which color-component values of two colors are stored. More specifically, color-component values of two colors are handled as 4-byte data at the same time. This is because handling the data in a 4-byte unit is most effective in a case where a CPU capable of processing 32-bit (4 byte) data in a one arithmetic processing is used.

Further, in the present aspect, since a maximum value of the color-component values of CMYK is constituted so as to be 255 ($=2^8-1$) or less and a maximum value of total weighting factors $W_T$ is constituted so as to be 255 ($=2^0-1$) or less, a 2-byte (16 bit) area is allocated by each color. However, a size of the area to be allocated by each color can be changed appropriately depending on a maximum value of the component values of CMYK and a maximum value of total weighting factors $W_T$. More specifically, where a maximum value of the color-component values of CMYK is constituted so as to be ($2^N-1$) or less and a maximum value of total weighting factors $W_T$ is constituted so as to be ($2^M-1$) or less, an arithmetic processing can be conducted at high accuracy by allocating at least an area of N+M bit by each color. In other words, multiplication results obtained by multiplying a weighting factor W by the color-component values of CMYK are to be $2^{N+M}-1$ or less. Thereby, since multiplication results by each color are inevitably stored in an area of N+M bit, such an event is prevented that the multiplication results of certain color-component values overflow into another area to destroy the multiplication results of other color-component values. Further, cumulative addition results obtained by cumulatively adding multiplication results with respect to the points by each color are also to be $2^{N+M}-1$ or less. Therefore, since cumulative addition results by each color are inevitably stored inside an area of N+M bit, such an event is prevented that the cumulative addition results of certain colors overflow into another area to destroy the cumulative addition results of other colors.

Further, where the CPU 11 has an 8n bit CPU (n is any given positive integral number), an accumulator 11a is in general constituted by an 8n bit memory. Therefore, where an area of (N+M) bit is allocated by each color, it is possible to store color-component values of 8n/(N+M) colors in one accumulator 11a.

According to the aspects, since the addition unit adds multiplication results of the color-component values of at least two colors stored in one arithmetic memory by the multiplication unit and cumulative values stored in the one cumulative value memory in a one addition processing by each color, such an effect is obtained that the number of additions is reduced as compared with a case where an addition processing for adding the multiplication results and the cumulative values is conducted individually by each color, thereby making it possible to improve a processing speed in a whole color conversion processing.

According to the aspects, since at least N+M bit area is allocated by each color and stored at mutually different areas of one arithmetic memory by the value storing unit, such an effect is obtained that an arithmetic processing can be conducted at a high accuracy. More specifically, when a maximum value of the color-component values of the second color group stored in the color conversion table is constituted so as to be greater than $2^{N-1}-1$ but $2^N-1$ or less and a total maximum value of weighting factors obtained by the weighting factor obtaining unit is constituted so as to be greater than $2^{M-1}-1$ but $2^M-1$ or less, multiplication results obtained by multiplying the color-component values of the second color group by a weighting factor obtained with respect to lattice points corresponding to the color-component values of the second color group are to be $2^{N+M}-1$ or less. Since multiplication results by each color are inevitably stored in a N+M bit area, such an event is prevented that multiplication results of certain color-component values overflow into another area in the arithmetic memory to destroy multiplication results of other color-component values.

It is noted that cumulative addition results obtained by the addition unit in which multiplication results with respect to the lattice points are cumulatively added by each color by the multiplication unit are also to be $2^{N+M}-1$ or less. More specifically, cumulative addition results by each color are inevitably stored in a N+M bit area. Since cumulative values are stored at mutually different areas of one cumulative value memory in the same arrangement as the arithmetic memory (in other words, at least a N+M bit area is allocated by each color and stored), such an event is prevented that cumulative addition results of certain colors overflow into another area in one cumulative value memory to destroy cumulative addition results of other colors.

According to the aspects, since the color-component values of color numbers corresponding to bit numbers processable by a CPU in a one arithmetic processing are stored in one arithmetic memory, such an effect is obtained that an arithmetic processing can be conducted effectively to improve a processing speed in a whole color conversion processing.

According to the aspects, since a 2 byte area is allocated by each color and stored at mutually different areas of one arithmetic memory by the value storing unit, such an effect is obtained that an arithmetic processing can be conducted at a high accuracy. More specifically, when a maximum value of the color-component values of the second color group is constituted so as to be greater than 127 but 255 or less and a total maximum value of weighting factors obtained by the weighting factor obtaining unit is constituted so as to be greater than 127 but 255 or less, multiplication results obtained by multiplying the color-component values of the second color group by a weighting factor obtained with respect to lattice points corresponding to the color-component values of the second color group are to be $2^{16}-1$ or less. Since the multiplication results by each color are inevitably stored in a 2-byte area, such an event is prevented that multiplication results of certain color-component values overflow into another area to destroy multiplication results of other color-component values.

According to the aspects, since a 2-byte area is allocated individually to store the color-component values of four colors in one arithmetic memory having 64 bits (8 bytes) processable by a CPU in a one arithmetic processing, such an effect is obtained that a multiplication processing, which was conducted for CMYK individually, can be conducted once, thereby making it possible to multiply a weighting factor by the color-component values of four colors and also to improve a processing speed in a whole color conversion processing.

It is noted that since cumulative additional values are stored at mutually different areas of one cumulative value memory in the same arrangement as the arithmetic memory (in other words, cumulative values of four colors are stored in one cumulative value memory), thereby adding multiplication results of the color-component values of four colors stored in the arithmetic memory by the multiplication unit and the cumulative values stored in the one cumulative value memory in a one addition processing by each color, such an effect is obtained that the number of additions is reduced to improve a processing speed in a whole color conversion processing.

According to the aspects, since a 2-byte area is allocated individually to store the color-component values of two colors in one arithmetic memory having 32 bits (4 bytes) processable by a CPU in a one arithmetic processing, such an effect is obtained that a multiplication processing, which was conducted for CMYK individually, can be conducted once, thereby making it possible to multiply a weighting factor by the color-component values of two colors and also to improve a processing speed in a whole color conversion processing.

It is noted that since cumulative additional values are stored at mutually different areas of one cumulative value memory in the same arrangement as the arithmetic memory (in other words, cumulative values of two colors are stored in one cumulative value memory), thereby adding multiplication results of the color-component values of two colors stored in the arithmetic memory by the multiplication unit and the cumulative values stored in the one cumulative value memory in a one addition processing by each color, such an effect is obtained that the number of additions is reduced to improve a processing speed in a whole color conversion processing.

According to the aspects, since the output unit reads out the cumulative addition results by each color and divides the read out cumulative addition results individually by a total of weighting factors obtained by the weighting factor obtaining unit, such an effect is obtained that an arithmetic processing can be conducted at a high accuracy.

According to the aspects, since a processing in which the color-component values of the second color group are read out from the color conversion table and stored in one arithmetic memory can quickly be conducted by the value storing unit, such an effect is obtained that a processing speed is increased in a whole color conversion processing.

According to the aspects, since when a weighting factor is determined not to be 0, the color-component values of the second color group corresponding to lattice points at which the weighting factor is obtained are stored in the arithmetic memory, such an effect is obtained that where the weighting factor is not 0, a multiplication processing by the multiplication unit and an addition processing by the addition unit are conducted to improve a processing speed in a whole color conversion processing. More specifically, where the weighting factor is 0, a multiplication result by the multiplication processing is to be 0. Thus, there is no change in cumulative value, even if the multiplication result of 0 is added by the addition processing. Therefore, where the weighting factor is 0, the multiplication processing by the multiplication unit and the addition processing by the addition unit are allowed to be omitted, thereby making it possible to further improve a processing speed.

What is claimed is:

1. A color conversion device that converts input values including color-component values of a first color group into color-component values of a second color group corresponding to the input values for outputting, the color conversion device comprising:
   a color conversion table that stores the color-component values of the second color group, which are associated with lattice points specified by the color-component values of the first color group, in a color specification space having values corresponding to the color-component values of the first color group provided on axes coordinates, the color-component values of at least two colors of the second color group being stored as a single piece of data for each of the lattice points;
   an area selecting unit that selects a cube, which contains positions of the input values therein, from cubes including lattice points to which the color-component values of the second color correspond in the color conversion table;
   an area coordinate determination unit that determines positions of the input values in the cube selected by the area selecting unit;
   a weighting factor obtaining unit that obtains a weighting factor at least on one lattice point of the lattice points included in the cube based on the position of the input values determined by the area coordinate determination unit;
   a value storing unit that reads out a single piece of data including the color-component values of the second color group corresponding to the lattice points for which the weighting factor is obtained by the weighting factor obtaining unit from the color conversion table, and the value storing unit storing the values in an arithmetic memory;
   a multiplication unit that multiplies the single piece of data including the color-component values of the second color group stored in the arithmetic memory by the value storing unit with the weighting factor obtained with respect to lattice points corresponding to the color-component values of the second color group;
   an addition unit that cumulatively adds the multiplication results of the lattice points obtained by the multiplication unit;
   an output unit that reads out the cumulative addition result for each color, and divides the read out cumulative addition result individually by a total of the weighting factors obtained by the weighting factor obtaining unit, thereby calculating and outputting the color-component values of the second color group corresponding to the input values; and
   a weighting-factor determining unit that determines whether a weighting factor obtained by the weighting factor obtaining unit is 0 or not, wherein:
   the value storing unit stores the color-component values of the second color group corresponding to lattice points at which the weighting factor is obtained in the arithmetic memory, when the weighting-factor determining unit determines that the weighting factor is not 0, and
   the value storing unit does not store the color-component values of the second color group corresponding to lattice points at which the weighing factor is obtained in the arithmetic memory, when the weighting-factor determining unit determines that the weighting factor is 0.

2. The color conversion device according to claim 1, wherein:
   the addition unit stores a cumulative value of the same colors as at least two colors in which the color-component values are stored in the arithmetic memory by the value storing unit, which is a cumulative value obtained by cumulatively adding by each color the multiplication results with respect to the lattice points obtained by the multiplication unit, at mutually different areas of one cumulative value memory in the same arrangement as the arithmetic memory; and
   the addition unit adds by each color the multiplication results of the color-component values of at least two colors stored in the arithmetic memory by the multiplication unit and the cumulative value stored in the one cumulative value memory in a one addition processing.

3. The color conversion device according to claim 1, wherein
   when a maximum value of the color-component values of the second color group stored in the color conversion table is constituted so as to be greater than 2N−1−1 but 2N−1 or less (N is any given positive integral number) and a total maximum value of weighting factors obtained by the weighting factor obtaining unit is constituted so as to be greater than 2M−1−1 but 2M−1 or less (M is any given positive integral number), the value storing unit allocates at least an area of N+M bit by each color and stores the color-component values of at least two colors by each color at mutually different areas of the arithmetic memory.

4. The color conversion device according to claim 3, wherein;
   a CPU functions as the multiplication unit and the addition unit, and the CPU includes an 8n-bit CPU (n is any given positive integral number) and an n-byte memory that functions as the arithmetic memory; and
   the value storing unit stores color-component values of 8n/(N+M) colors of the second color group at mutually different areas of the arithmetic memory by each color.

5. The color conversion device according to claim 1, wherein:
   a maximum value of the color-component values of the second color group stored in the color conversion table is constituted so as to be greater than 127 but 255 or less;
   a total maximum value of weighting factors obtained by the weighting factor obtaining unit is constituted so as to be greater than 127 but 255 or less; and the value storing unit allocates a 2-byte area by each color and stores the color-component values of at least two colors by each color at mutually different areas of the arithmetic memory.

6. The color conversion device according to claim 5, wherein:
a CPU functions as the multiplication unit and the addition unit, and the CPU includes an 64-bit CPU and an 8-byte memory that functions as the arithmetic memory; and
the value storing unit allocates a 2-byte area respectively to four colors of the second color group and stores the color-component values of the four colors in the arithmetic memory.

7. The color conversion device according to claim 5, wherein a CPU functions as the multiplication unit and the addition unit, and the CPU includes an 32-bit CPU and an 4-byte memory that functions as the arithmetic memory; and
the value storing unit allocates a 2-byte area respectively to two colors of the second color group and stores the color-component values of the two colors in the arithmetic memory.

8. The color conversion device according to claim 1, wherein
the color-component values of the second color group, which are associated with the lattice points in the color conversion table, are stored by the value storing unit in a unit at which the color-component value is written into the arithmetic memory.

9. A computer program product for enabling a computer to converts input values including the color-component values of a first color group into color-component values of a second color group corresponding to the input values for outputting, the computer program product comprising:
software instructions for enabling the computer to perform predetermined operations; and
a computer readable medium bearing the software instructions, wherein:
the computer includes a color conversion table that stores the color-component values of the second color group, which are associated with lattice points specified by the color-component values of the first color group, in a color specification space having values corresponding to the color-component values of the first color group provided on axes coordinates, the color-component values of at least two colors of the second color group being stored as a single piece of data for each of the lattice points;
the predetermined operations include:
selecting a cube, which contains positions of the input values therein, from cubes including lattice points to which the color-component values of the second color group correspond in the color conversion table;
determining positions of the input values in the selected cube;
obtaining a weighting factor at least on one lattice point of the lattice points included in the cube based on the determined position of the input values;
reading out a single piece of data including the color-component values of the second color group corresponding to the lattice points for which the weighting factor is obtained from the color conversion table, and storing the values in an arithmetic memory;
multiplying the single piece of data including the color-component values of the second color group stored in the arithmetic memory with the weighting factor obtained with respect to lattice points corresponding to the color-component values of the second color group;
cumulatively adding the multiplication results of obtained the lattice points;
reading out the cumulative addition result for each color, and dividing the read out cumulative addition result individually by a total of the weighting factors obtained by the weighting factor obtaining step, thereby calculating and outputting the color-component values of the second color group corresponding to the input values; and
determining whether a weighting factor obtained by the weighting factor obtaining unit is 0 or not,
wherein said storing the values in the arithmetic memory includes:
storing the color-component values of the second color group corresponding to lattice points at which the weighting factor is obtained in the arithmetic memory, when the weighting-factor determining step determines that the weighting factor is not 0, and
not storing the color-component values of the second color group corresponding to lattice points at which the weighing factor is obtained in the arithmetic memory, when the weighting-factor determining step determines that the weighting factor is 0.

10. The computer program product according to claim 9, further comprising:
storing a cumulative value of the same colors as at least two colors in which the color-component values are stored in the arithmetic memory by the value storing unit, which is a cumulative value obtained by cumulatively adding by each color the multiplication results with respect to the lattice points obtained by the multiplication unit, at mutually different areas of one cumulative value memory in the same arrangement as the arithmetic memory, and adding by each color the multiplication results of the color-component values of at least two colors stored in the arithmetic memory by the multiplication unit and the cumulative value stored in the one cumulative value memory in a one addition processing, when the cumulative adding of the multiplication results.

11. The computer program product according to claim 9, wherein when a maximum value of the color-component values of the second color group stored in the color conversion table is constituted so as to be greater than $2N-1-1$ but $2N-1$ or less (N is any given positive integral number) and a total maximum value of weighting factors obtained by the weighting factor obtaining unit is constituted so as to be greater than $2M-1-1$ but $2M-1$ or less (M is any given positive integral number), the storing allocates at least an area of N+M bit by each color and stores the color-component values of at least two colors by each color at mutually different areas of the arithmetic memory.

12. The computer program product according to claim 11, wherein;
the computer includes a CPU that performs the multiplying and the cumulative adding;
the CPU includes an 8n-bit CPU (n is any given positive integral number) and an n-byte memory that functions as the arithmetic memory; and
the storing stores color-component values of 8n/(N+M) colors of the second color group at mutually different areas of the arithmetic memory by each color.

13. The computer program product according to claim 9, wherein:
a maximum value of the color-component values of the second color group stored in the color conversion table is constituted so as to be greater than 127 but 255 or less;
a total maximum value of weighting factors obtained by the weighting factor obtaining unit is constituted so as to be greater than 127 but 255 or less; and the storing allocates a 2-byte area by each color and stores the color-component values of at least two colors by each color at mutually different areas of the arithmetic memory.

14. The computer program product according to claim 13, wherein:
the computer includes a CPU that performs the multiplying and the cumulative adding;
the CPU includes an 64-bit CPU and an 8-byte memory that functions as the arithmetic memory; and
the storing allocates a 2-byte area respectively to four colors of the second color group and stores the color-component values of the four colors in the arithmetic memory.

15. The computer program product according to claim 13, wherein
the computer includes a CPU that performs the multiplying and the cumulative adding;
the CPU includes an 32-bit CPU and an 4-byte memory that functions as the arithmetic memory; and
the storing allocates a 2-byte area respectively to two colors of the second color group and stores the color-component values of the two colors in the arithmetic memory.

16. The computer program product according to claim 9, wherein the color-component values of the second color group, which are associated with the lattice points in the color conversion table, are stored by the storing in a unit at which the color-component value is written into the arithmetic memory.

17. The color conversion device according to claim 1, wherein:
the value storing unit stores each of the color-component values of the second color group in corresponding one of a plurality of areas provided in the arithmetic memory, each of the areas including a higher byte and a lower byte,
the multiplication unit multiplies the weighting factor respectively by the color-component values stored in respective areas of the arithmetic memory with the weighting factor obtained with respect to the lattice points in one multiplication processing,
the addition unit cumulatively adds the multiplication results of the lattice points obtained by the multiplication unit in one addition processing for respective colors, and
the output unit divides the cumulative addition result for each color individually by the total of the weighting factors.

18. The color conversion device according to claim 1,
wherein the single piece of data is a single string of values, the string including at least two mutually different areas, and
wherein the value in each of the areas indicates the color-component value of a corresponding color.

19. The color conversion device according to claim 18,
wherein the output unit reads a value of an area of the cumulative addition result, which corresponds to each color.

20. The color conversion device according to claim 1,
wherein the weighting factor obtaining unit obtains eight weight factors corresponding to eight vertices of the selected cube, and
wherein for any input values, a number of the obtained weight factors which are not zero is not more than four.

* * * * *